(12) United States Patent
Kampanakis et al.

(10) Patent No.: US 12,549,592 B1
(45) Date of Patent: Feb. 10, 2026

(54) AMPLIFICATION REFLECTION ATTACK PROTECTION VIA ROUTING POLICY-AWARE TRAFFIC HANDLING

(71) Applicant: Amazon Technologies, Inc., Seattle, WA (US)

(72) Inventors: Panagiotis Kampanakis, Apex, NC (US); Jonathan Daniel Bean, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 234 days.

(21) Appl. No.: 18/343,940

(22) Filed: Jun. 29, 2023

(51) Int. Cl.
*H04L 9/40* (2022.01)

(52) U.S. Cl.
CPC ...... *H04L 63/1441* (2013.01); *H04L 63/0236* (2013.01); *H04L 63/20* (2013.01)

(58) Field of Classification Search
CPC .. H04L 63/1441; H04L 63/0236; H04L 63/20
See application file for complete search history.

(56) References Cited

U.S. PATENT DOCUMENTS

| 2004/0068582 | A1* | 4/2004 | Anderson | H04L 61/3015 709/245 |
| 2015/0213449 | A1* | 7/2015 | Morrison | G06Q 20/4016 705/44 |
| 2016/0344765 | A1* | 11/2016 | Shiell | H04L 63/1458 |
| 2020/0336553 | A1* | 10/2020 | Yeddula | H04L 67/61 |
| 2020/0389535 | A1* | 12/2020 | Zmijewski | H04L 67/52 |
| 2021/0314260 | A1* | 10/2021 | Hayes | H04L 63/0823 |
| 2022/0360601 | A1* | 11/2022 | Rose | H04L 63/0236 |

OTHER PUBLICATIONS

Lara et al., "OpenSec: Policy-Based Security Using Software-Defined Networking", Mar. 2016, IEEE Transactions on Network and Service Management, vol. 13, No. 1, pp. 30-42 (Year: 2016).*
Oliveira et al., "Geographically Informed Inter-Domain Routing", Mar. 2021, IEEE International Conference on Network Protocols, pp. 103-112 (Year: 2021).*

* cited by examiner

*Primary Examiner* — Kenneth W Chang
(74) *Attorney, Agent, or Firm* — Nicholson DeVos Webster & Elliott LLP

(57) ABSTRACT

Techniques for amplification reflection attack protection using routing policy-aware traffic handling are described. A routing policy is indicative of how clients are to be routed amongst multiple destinations for a resource. The routing policy can be used to configure a responder component to enable the responder component to determine which sources of traffic it should expect. When unexpected traffic arrives at the responder, such as spoofed traffic that is part of an amplification reflection attack, the responder can drop the traffic or perform another remediative action to protect the attack target.

20 Claims, 10 Drawing Sheets

US 12,549,592 B1

AMPLIFICATION REFLECTION ATTACK PROTECTION VIA ROUTING POLICY-AWARE TRAFFIC HANDLING

BACKGROUND

In computing, distributed denial-of-service (DDOS) attacks are malicious attempts to disrupt the normal traffic or operation of a targeted server, service, or network by overwhelming the target or its surrounding infrastructure with a flood of network traffic. DDOS attacks achieve effectiveness by being distributed in nature, thus utilizing multiple (typically compromised) computer systems as sources of attack traffic.

One type of DDOS attack type is a reflection attack, where an attacker can spoof a target's Internet Protocol (IP) address and send a request for information to some server or responder that will serve as a "reflector," often using the User Datagram Protocol (UDP). This is because the reflection of traffic with a spoofed IP source address is possible due to the lack of proper handshake, though in some cases Transmission Control Protocol (TCP) may also be used. The reflector server then responds to the request, sending an answer to the target—but not the attacker—via use of the target's IP address. In typical attacks, many such reflectors can be used, causing many different servers to overwhelm the target with traffic, consuming or exhausting its processing and/or networking resources.

Another type of attack is an amplification attack. Amplification attacks, which are typically categorized as being either flooding or volumetric attacks, occur when an attacker can "amplify" the traffic that they send toward a target. For example, an attacker may be able to send a request (via spoofing a target's IP address) and cause some reflector server to send a comparatively larger response to the target.

Thus, an amplification reflection attack that utilizes both reflection and amplification techniques can generate incredibly large amounts of malicious traffic directed at a target. Typically, attackers use open servers to amplify their attack traffic by up to one-hundred times (or more) the original source traffic performing the attack. Prevalent forms of these attacks often rely on millions of exposed Domain Name Service (DNS), Network Time Protocol (NTP), Simple Network Management Protocol (SNMP), Simple Service Discovery Protocol (SSDP), and other UDP/TCP-based services.

BRIEF DESCRIPTION OF DRAWINGS

Various examples in accordance with the present disclosure will be described with reference to the drawings, in which.

DETAILED DESCRIPTION

The present disclosure relates to methods, apparatus, systems, and non-transitory computer-readable storage media for amplification reflection attack protection using routing policy-aware traffic handling. According to some examples, servers can utilize routing configuration data, adapted from routing policies, to eliminate or greatly reduce the possibility of playing a large role as an attack reflector in an amplification reflection attack. In some examples, insights from routing policies that govern how clients are to be routed amongst multiple instances of an application can be used and applied by reflection amplification protection ("RAP") modules implemented in or with these instances. With such routing configuration data, these RAP modules can quickly identify traffic that is a part of such amplification reflection attacks and perform a remediative action, such as ignoring the requests or requiring further involvement from the apparent source of the traffic. This arrangement can significantly reduce the amount of participation by the application instance in being an inadvertent reflector involved in the attack, while not substantially affecting legitimate clients or typical operation of the application. Thus, examples can limit the size and scope of amplification reflection attacks, reduce the network and processing load put upon such inadvertent attack reflectors, as well as reduce the network and processing load placed upon targets of these attacks.

Figure 1:
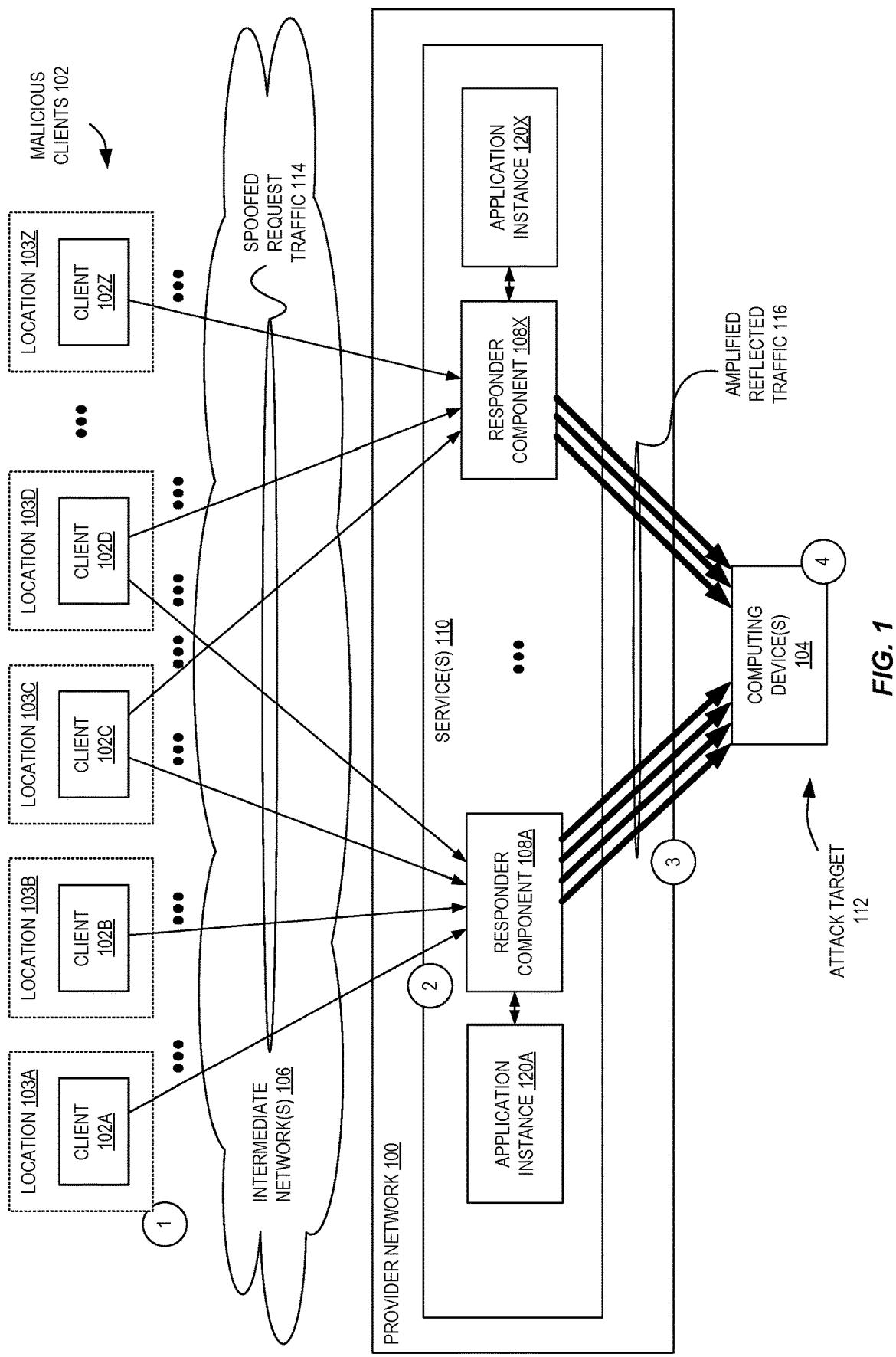
FIG. 1 is a diagram illustrating an amplification reflection attack using provider network resources as an attack reflector according to some examples.

The computing industry has historically seen aggressive amplification reflection attacks that leverage protocols running over UDP. In such attacks, the attacker spoofs small requests towards a server (or responder), whose responses are much larger in size than the size of the requests. For example, FIG. 1 is a diagram illustrating an amplification reflection attack using provider network 100 resources as an attack reflector according to some examples. In FIG. 1, a variety of clients 102A-102Z (e.g., software executed by one or more computing devices) may be at a variety of locations 103A-103Z (e.g., buildings, cities, states, provinces, countries, etc.). These clients 102 may be under the control of a malicious actor, e.g., being part of a botnet. As shown at circle (1), these clients 102 may be directed to initiate an amplification reflection attack, e.g., by sending particular types of requests that are spoofed via use an attack target's 112 network address as a source address. These requests are received at various servers (each inadvertently acting as a "reflector" component 108) of services 110 that are part of or associated with an application, which at circle (3) are caused (by the spoofed request traffic 114) to send amplified traffic 116 at circle (3), using the request source address as a destination address of the amplified reflected traffic 116, onward toward one or more computing devices 104 serving as the attack target 112. In many cases, this flood of traffic can cause operational issues or failure, as shown by circle (4), for the recipient computing devices 104 and networks.

Of note, a small effort of an attacker by sending small packets can lead to the generation of very large volumes of traffic, which can produce a distributed denial of service (DDOS) attack on the victim. In these attacks, the cost to the attacker is much lower than the impact it has. With 10-times (or less) volume, an attacker can amplify its messaging and can completely disrupt or halt a victim's computing resources. One example of such an attack includes the use of malicious, spoofed requests issued to open Internet DNS resolvers. In this case, the small DNS packets triggered big DNS responses, producing many gigabytes of traffic of data that brought down networks.

Further, amplification reflection attacks can be exacerbated in a post-quantum world. Recently, there has been great attention towards quantum-resistant cryptography. Quantum computers, if and when they make it to production environments, could threaten asymmetric cryptographic algorithms as we know them. To this end, NIST has initiated a Post-quantum Project for standardizing quantum safe algorithms. These algorithms offer bigger keys, ciphertexts, and signatures. However, as a result, when used in UDP-based protocols a spoofed small packet by an attacker could trigger 10-20 KB, or more, of data from the responder. Currently, in the case of DNS-based attacks, the amplification factor could even be around 5-10× times, but with post-quantum algorithms it could become 20-times or more, which could multiply the impact attackers could have. Additionally, the reflectors now become open servers that are expected to respond to the whole world, so blocking such attacks is not as straightforward.

The responding servers, which could act as amplification reflectors in this case, could potentially be legitimate servers hosted in cloud provider networks, while the provider networks may not have straightforward ways to subvert such attacks. For example, a common server implementing a web application needs to be open to all clients to serve web content, while there is no straightforward way to identify UDP spoofing without slowing down legitimate connections.

Accordingly, in some examples, a reflector candidate validates the source of incoming traffic based on pre-known criteria about where requesters are expected to come from. These criteria can come, for example, from routing policies that were configured by the associated user. Currently, users that deploy services—such as in cloud provider network environments—may use policy routing to decide where requests are routed. For example, some use location-based routing which allows the requesting client to reach services (responders) in their vicinity, which improves performance, enables distribution control in locations the user has rights, and/or allows for localized language services. Alternatively, clients sometimes are directed based on a routing policy that load balances to different responders to equally distribute load. In these cases, the routing policy owner is aware of what source addresses are expected to arrive at the service/responder. Addresses that are not expected to arrive at that service could be spoofed or otherwise be deploying an amplification reflection attack against UDP-based services. Examples utilize an integration of the routing policy provider/owner with a spoofing protection mechanism at the candidate reflector to prevent amplification reflection spoofing attempts. By providing this functionality, the attack does not even start, instead of trying to defend against it after it has started affecting services like is done today. In some examples, this can decrease the amount of egress traffic on the part of the responder, wasted computational and network resources, and prevent the reflector from itself being subject to a DDOS attack.

Examples disclosed herein describe a method for the integration of routing policies, such as those used by many cloud provider network customers today, in order to subvert amplification reflection attacks at the reflector. In some examples, this mechanism can prevent such attacks early, whereas many existing DDOS protections deploy mitigations after the attack has started and can be identified. Examples described herein provide an approach that blocks amplification reflection attacks before they can even get triggered. This is particularly beneficial as generally, the most effective protection against a DDOS attack is to stop it as close to the source as possible before it overwhelms any networks or victim infrastructure.

In some examples, the disclosed techniques and systems can take advantage of existing routing policy mechanisms that allow users to route traffic to their infrastructure the way they desire. Given that the routing policy is known to the user who owns or manages the application, it can be integrated with the amplification reflector candidate resource which is owned by the customer and thus be used to prevent spoofed amplification attempts to potential victims which are not expected to communicate with the resource.

In some examples, routing policies can be from a cloud provider network's DNS service, and/or the (inadvertent) reflector may also be implemented in the cloud provider network, such as via a hardware virtualization service, a load balancer service, a content delivery network service, or the like, which could be hosting services over UDP like DTLS or QUIC. These reflection amplification protection mechanisms could also be deployed in cloud network infrastructure such as an API gateway service or component, a web application firewall service or component, a network accelerator service, etc.

Figure 2:
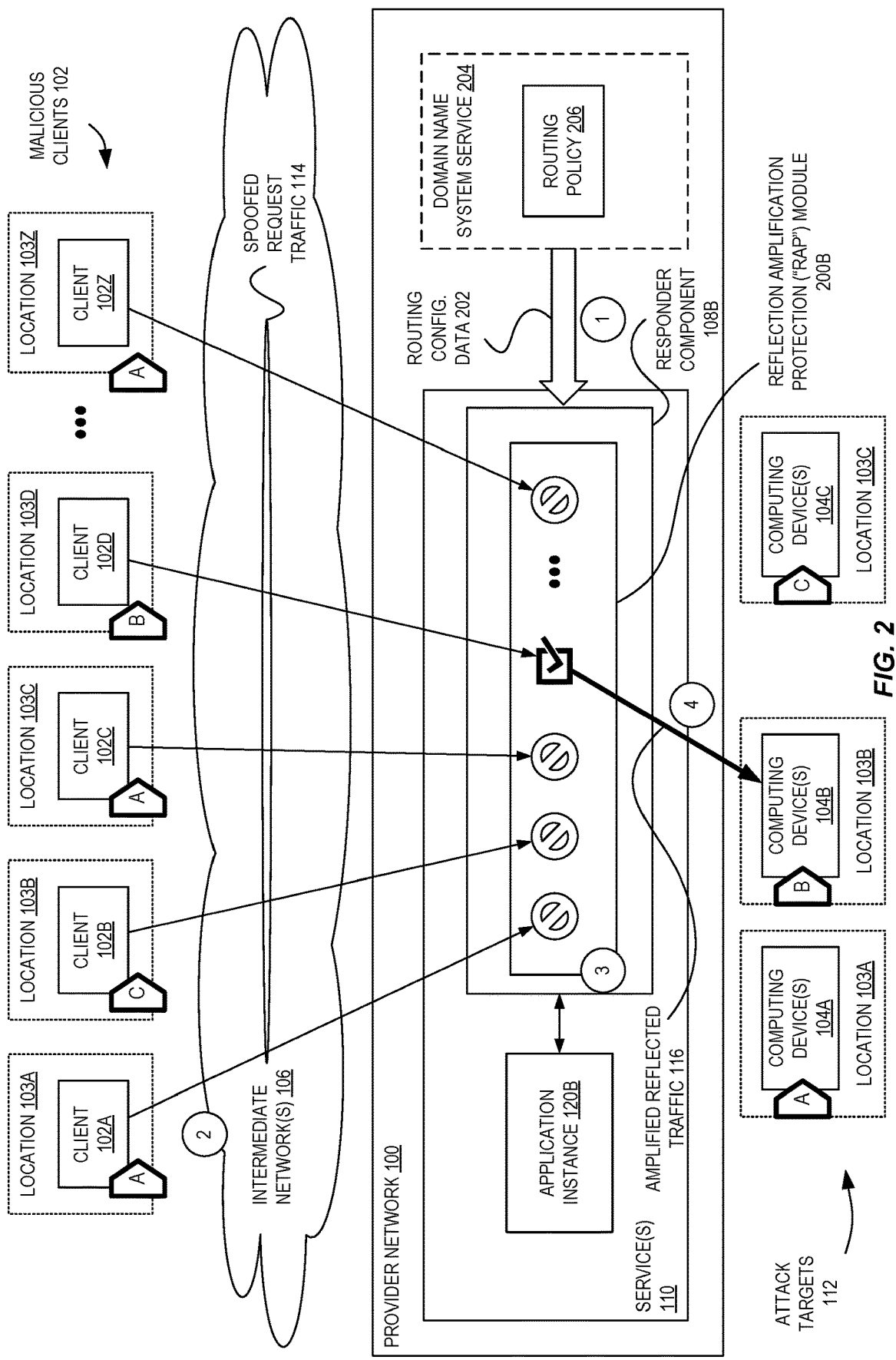
FIG. 2 is a diagram illustrating amplification reflection attack protection using routing policy-aware traffic handling according to some examples.

FIG. 2 is a diagram illustrating amplification reflection attack protection using routing policy-aware traffic handling according to some examples. In this example, one responder component 108A and application instance 120A are illustrated for the sake of simplicity, though it is to be understood that some examples include numerous responders and applications instances. Additionally, as shown here, the responder component 108A is shown as being distinct from the application instance 120A (e.g., a function, library, application, or even virtual machine instance or container) that provides core application aspects, in some examples the responder component 108A is a part of (or within) the application instance 120A.

In some examples, a domain name system (DNS) service 204, either a part of a provider network 100 or completely separate therefrom, may support the use of routing policies 206. The DNS service 204 may allow its users to generate records to tell the service how to route for a particular domain. For example, a user might create records that cause the DNS service 204 to do the following: route internet traffic for "example.com" to the IP address of a host in the user's data center, route email for that domain (e.g., "ichiro@example.com") to a particular mail server (mail- .example.com), and/or route traffic for a subdomain called "operations.tokyo.example.com" to the IP address of a different host.

As part of this configuration process, a user may choose one or more routing policies, which instructs the DNS service 204 regarding how to respond to DNS queries. A variety of types of policies could be implemented, based on the needs of the user for a particular application. For example, a simple routing policy could be implemented which directs all traffic for a particular domain to a particular server or network address.

However, another type of routing policy 206 that could be configured could be more dynamic. For example, a geolocation routing policy could be used to route traffic based on the location of users (that is, clients issuing requests involving the application) to a particular destination server that is "closest" to each requesting user, such as by directing a request originating in the United States or Canada to a data center in Los Angeles, while a request originating in Europe or Asia might instead be directed to a data center in Frankfurt, Germany. These locations in some examples can be of different levels of granularity, ranging from continents, to countries, states or cities in the United States, provinces in Canada, or the like. As similar type of policy could be a geoproximity routing policy, which attempts to route traffic based on the closeness, in terms of distance, between clients and the location of the available resources, which can further assist in shifting traffic from resources in one location to resources in another.

Other types of routing policies can also be used, such as latency routing policies that attempt to route traffic to the region that provides the best latency, IP-based routing policies that attempt to route traffic based on the location of your users as reflected by their IP addresses, multivalue answer routing policies that enable DNS responses to DNS queries could include up to eight healthy records selected at random, or weighted routing policies that seek to route traffic to multiple resources according to proportions (or distributions) that a customer may specify.

These routing policies 206 thus include sufficient information to indicate how request traffic is to be routed amongst potentially multiple recipients (e.g., endpoints, IP addresses, URLs, etc.). This information can be transformed into routing configuration data 202, which at circle (1) is transmitted to the responder component 108A to be configured for use by a reflection amplification protection ("RAP") module 200B. This transmission and configuration may be done in a relatively "static" manner, whereby it occurs upon a change to the routing policy 206, a change to the operation or configuration of associated responder components 108, or the like—however, other more "dynamic" approaches exist as detailed later herein. With this routing configuration data 202, the RAP module 200B can use it to determine when to proceed as normal (e.g., identify which received requests should be processed as typical), and when to implement a remediative action (e.g., drop the request, do not process it, and do not reply to it; send a response that requires a recipient to further act to obtain the requested information (e.g., send a cookie value that must be used in a subsequent request to get the requested information), which an unexpecting attack target 112 would not do.

Accordingly, as shown, at circle (2) a set of malicious clients 102 may begin an amplification reflection attack, in which the clients 102 generate spoofed request traffic 114 (e.g., having a source IP address of that of one of the attack targets 112) that is directed toward a responder component 108B associated with (or part of) an application instance 120B. As shown, the clients 102 are targeting three different attack targets 112—computing devices 104A, 104B, and 104C, deployed in locations 103A, 103B, and 103C, respectively.

In this example, the RAP module 200 is deployed such that it obtains the requests, at circle (3), and based on its routing configuration data 202, can determine which requests should be processed and which require a remediative action (e.g., dropping the request, or issuing a non-standard response). As shown, it could be the case that the routing policy performs a type of geolocation-based routing, such that this particular application instance 120B will only process traffic received that has an originating client appearing to be in one particular location—here, location 103B. Thus, per use of the routing configuration data 202, the RAP module 200 can determine that many received requests (e.g., coming from clients 102A-102C as well clients 102E-102Z) originated from clients using a spoofed source address that is not within location 103B.

For example, client 102A is illustrated with a flag of "A", indicating that it is targeting computing device(s) 104A at location 103A, and thus uses a source IP address of computing device(s) 104A, which can be mapped to being part of location 103A. When it sends a request to (be reflected and amplified by) responder component 108B, the RAP module 200B can identify the source address from the traffic (which is spoofed), determine that the source address belongs to location 103A (and is not in the allowable location of location 103B), and then perform a remediative action, e.g., dropping/ignoring the request. Likewise, client 102B is shown with a flag of "C" and thus is targeting computing device(s) 104C in location 103C, and thus its spoofed attack traffic, using a source IP address of the computing device(s) 104C in location 103C, can also be determined as not being within allowed location 103B, and this traffic also is blocked.

As a result, huge amounts of traffic can effectively be "blocked" by the RAP module 200B. Moreover, in many systems, multiple such RAP modules 200B are utilized, each allowing only particular traffic to be processed, and this even further reduces the impact of the attack. As shown, only one request is actually processed and sent on to the target computing device(s) 104B at circle (4), which is a massive reduction, compared to the full attack had it been successful. Typically, such limited streams of attack traffic that "go through" can be sufficiently handled by the target using their existing resources, and/or this limited traffic can more easily be blocked by other techniques, such as within the provider network using a more fine-grained approach.

Figure 3:
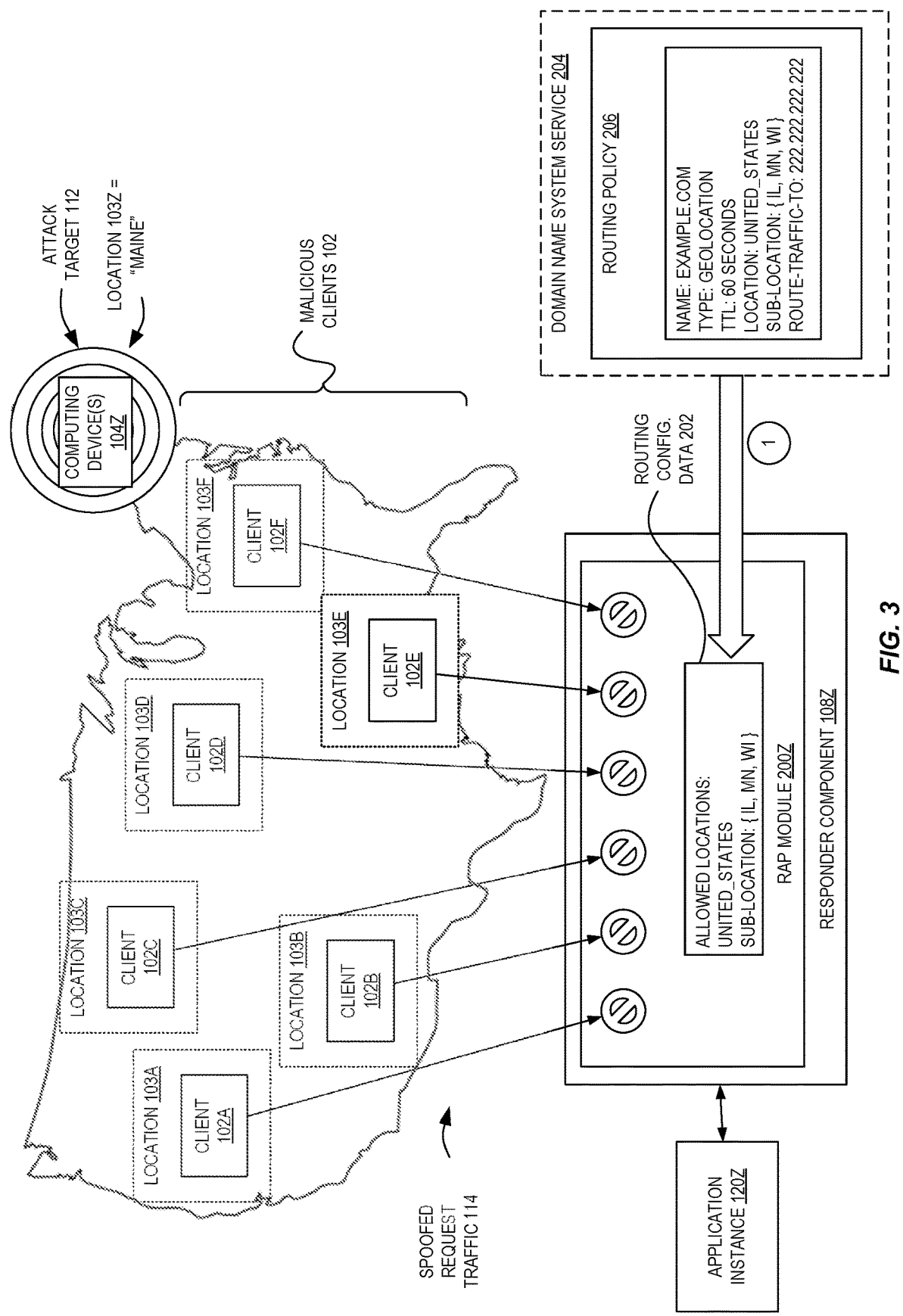
FIG. 3 is a diagram illustrating an exemplary geolocation-type routing policy involved in amplification reflection attack protection using routing policy-aware traffic handling according to some examples.

For further clarity, FIG. 3 is a diagram illustrating an exemplary geolocation-type routing policy involved in amplification reflection attack protection using routing policy-aware traffic handling according to some examples. In this example, six clients 102A-102F at six locations 103A-103F are all attempting to attack an attack target 112 (computing device(s) 104Z) within location 103Z, which we stipulate is located in the state of Maine, within the United States.

In this example, per a geolocation-based routing policy 206 indicates that all traffic originating from a perceived location within the states of Illinois (IL), Minnesota (MN), or Wisconsin (WI) should be routed to some destination using a network address of 222.222.222.222.

However, as shown, even though the six clients 102A-102F know the address of the target and seek to attack by spoofing traffic using that address as a source, when they send their request through responder component 108Z, the RAP module 200Z can determine that each apparent source address (of 222.222.222.222) is associated with a different location (Maine) that is outside of the allowed locations of the RAP module 200Z, namely, Illinois and Minnesota and Wisconsin. Thus, none of these requests are processed as normal, and thus the attack target does not bear the force of an amplified, reflected attack from this responder component 108Z.

Figure 4:
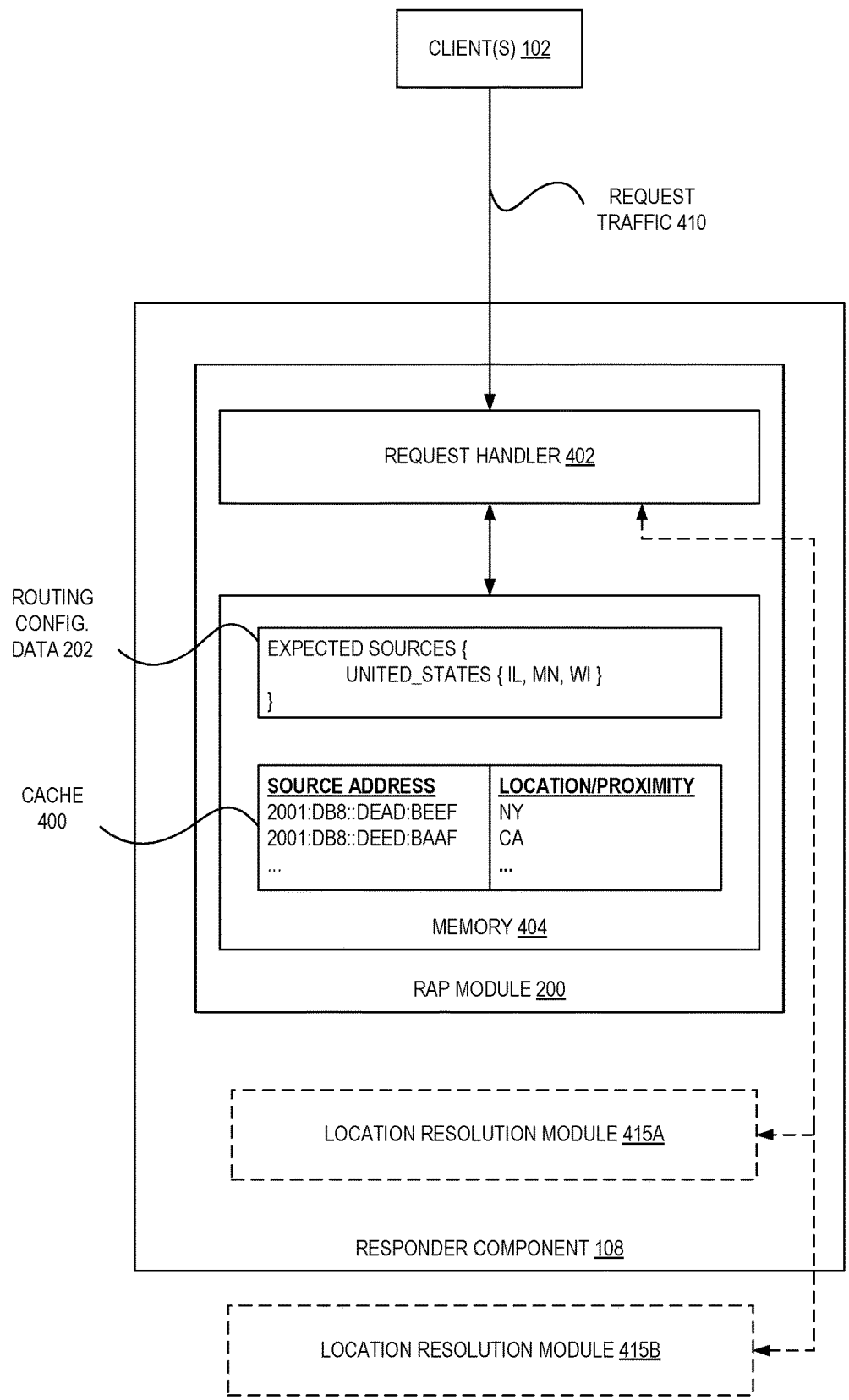
FIG. 4 is a diagram illustrating exemplary routing configuration data and a source-to-location mapping cache useful in amplification reflection attack protection using routing policy-aware traffic handling according to some examples.

As indicated herein, a routing policy for an application can be adapted into routing configuration data useful by a RAP module 200. In some examples, based on the characteristics of the RAP module 200B (and/or the responder component, application instance, etc.) such as its location, a routing configuration data can be created that is compact, responder-specific, and indicative of what sources of traffic are to be expected. For example, a routing configuration data 202 could simply include a list of U.S. states, a list of countries, a list of network address blocks, or the like, where traffic is expected to originate from. To this end, FIG. 4 is a diagram illustrating exemplary routing configuration data 202 and a source-to-location mapping cache 400 useful in amplification reflection attack protection using routing policy-aware traffic handling according to some examples. In this example, a RAP module 200 is illustrated as including a memory 404 (volatile or non-volatile) coupled to/with a request handler 402.

Upon request traffic 410 originated by clients 102 arriving at a responder component 108, the request is handled by the request handler 402, which can inspect the traffic's source IP address and determine whether it is "acceptable" for processing according to the routing configuration data 202, or whether a remediative action is to be performed. As one example, the request handler 402 may be adapted to call a location resolution module 415A (internal) or 415B (external), which can be a system that determines an associated location based on an input of a network address. Thus, the request handler 402 may send a request to a location resolution module 415, identifying the source network address (e.g., source IP address) of the request, and seeking an indication of the associated location. In this example, the source network address may be "2001:DB8::DEED:BAAF" (e.g., in a simple, exemplary IPv6 form) while the location may be resolved by the location resolution module 415A to be California.

The request handler 402 can then compare the resolved apparent location (California) with the permitted locations from the routing configuration data 202 (Illinois, Minnesota, and Wisconsin) to determine that the traffic is not expected. Thus, as one example, the request handler 402 may drop the request.

In some examples, the request handler 402 may utilize a cache 400 of previous mappings to save time. As shown, the cache 400 may comprise a data structure storing a mapping between network addresses and their resolved location—here, a first column for source addresses, and a second column for a resolved location. In some examples, after resolving an address to a location the request handler 402 can insert an entry for the mapping into the cache, assuming one does not already exist. The cache may use a variety of cache eviction techniques known to those of skill in the art, such as a first-in first-out (FIFO) scheme, a time-based expiration schedule, or the like. Moreover, prior to doing a resolution, in some examples the request handler 402 may first perform a lookup into the cache to determine whether the translated location for the address is stored therein. If so, resolution via a location resolution module 415 can be skipped, which is much faster and thus increases overall performance.

Figure 5:
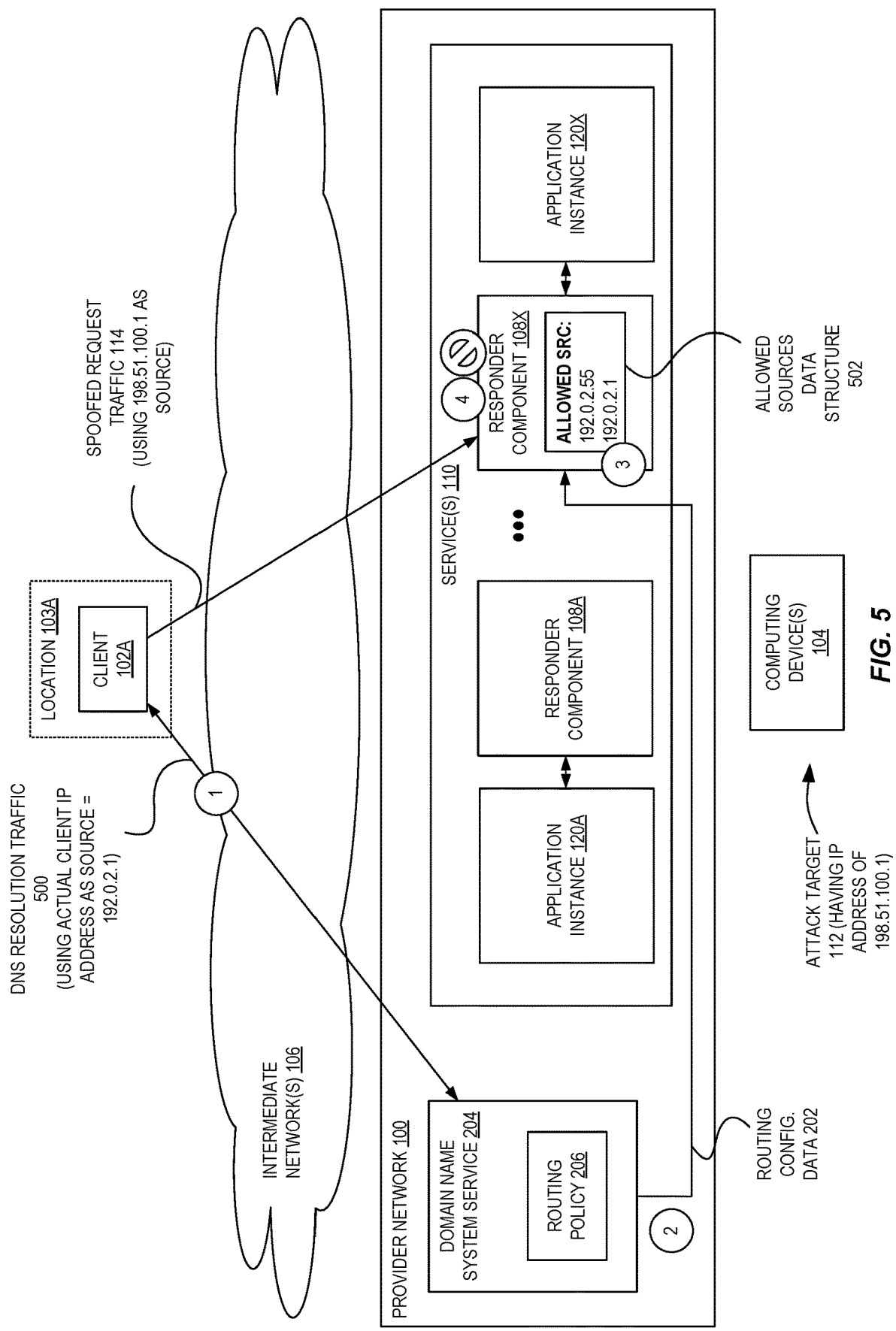
FIG. 5 is a diagram illustrating a dynamic just-in-time amplification reflection attack protection scheme using routing policy-aware traffic handling according to some examples.

FIG. 5 is a diagram illustrating a dynamic just-in-time amplification reflection attack protection scheme using routing policy-aware traffic handling according to some examples. As indicated earlier, in some examples, the transmission and configuration of routing configuration data 202 can be implemented in a more dynamic, just-in-time manner. Such configurations can be particularly practical in cloud provider network 100 environments.

A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

As described herein, one type of service 110 that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources can be maintained in a "ready" state (e.g., having a pre-initialized runtime environment configured to execute the serverless functions), allowing the serverless functions to be executed in near real-time.

A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least partly on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Another type of managed compute service can be a container service, such as a container orchestration and management service (referred to in various implementations as a container service, cloud container service, container engine, or container cloud service) that allows users of the cloud provider network to instantiate and manage containers. In some examples the container service 114 can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

Thus, the services 110 in these figures that implement the application instances and/or responder components may include ones of a variety of services, including but not limited to managed compute services such as a hardware virtualization service, container service, serverless code execution service, or the like.

In such cloud provider network 100 environments, various components and services are often communicatively coupled in a highly efficient manner, having both fast transmission time and high bandwidth therebetween. In such environments, the use of dynamic routing configuration data 202 updating may be a good option for some use cases. As shown in FIG. 5, in some examples a client 102A may first seek to identify a network address (e.g., an IP address) for an application via a DNS query as shown by circle (1), using its actual network address as a source so that a response comes back to it. In this example, the application is shown as including at least two application instances 102A and 120X deployed via services 110 in the provider network 100, each with an associated responder component 108A, 108X, respectively.

In this example, based on the routing policy 206 (e.g., a random selection, a round-robin selection, a load-based selection, etc.), the DNS service 204 can select or identify a particular application instance 120 to serve the client 102A. Here, application instance 120X (and responder component 108X, inherently) are selected for the client, and at circle (2), the DNS service 204 can send routing configuration data 202 to this responder component 108X for RAP module 200 configuration purposes. In some examples, this routing configuration data 202 may include a single network address of this client—here, shown as "192.0.2.1". To ensure that this routing configuration data 202 is successfully transmitted and configured by the responder component 108X, in some examples the DNS service 204 may transmit this routing configuration data 202 prior to return a DNS response to the client 102A, and optionally may await a confirmation, from the responder component 108X, that it has in fact updated itself (e.g., the RAP module 200) based on the update. As shown, an allowed sources data structure 502 has been updated to include an entry for "192.0.2.1" at circle (3).

Thus, a hostname or network address of the selected responder component 108X is returned to the client 102A in response to the DNS query. If the client 102A wished to interact with the responder component 108X in an upfront manner—i.e., by using its own IP address as a source in traffic it sends—the traffic would be processed successfully.

However, should the client 102A wish to implement a reflection type attack and thus spoof request traffic by using a source network address of that used by the attack target 112, here having an IP address of "192.51.100.1", at circle (4) that request would arrive at the responder component 108X. Upon processing by the RAP module 200—which includes identifying the (spoofed) source network address from the traffic and determining whether that address is in the allowed sources data structure 502 (it is not)—the RAP module 200B can determine to perform a remediative action, e.g., by dropping the traffic, and thus halting the attack and protecting both the provider network 100 and the attack target 112 (computing device(s) 104).

In addition to these dynamic and relatively static configuration techniques, in some other examples, certain routing configurations can be pre-configured by both the domain name system service and the responder components. For example, in some cases where a routing policy might perform random assignment of clients to application instances, or when the assignment is performed in an algorithmic or deterministic manner, the logic for performing the assignment can be provided to the responder components 108, allowing the responder components 108 to determine, on their own, whether a client that sent them a request is expected or allowed. For example, one routing policy could indicate that clients are to be routed between different application instances in the following manner: compute a hash based on the source IP address of the client (or, encrypt the source IP address) and examine a particular digit or value within that hash (e.g., the first, the last). If this value (e.g., 0 or 1) is in a first set (e.g., is 0), then it is to be sent to a first application instance 120A, but if the value is in a second set (e.g., is 1), then it is to be sent to a second application instance 120X. Thus, if each responder component is configured with this same logic, it can locally replicate the decision-making to determine whether the traffic is allowable or not. Of course, it is to be understood that many other functions could be used based on the needs of the implementor, and could be based on different aspects associated with the packet (e.g., different header values), different functions or transformations, and the like.

Figure 6:
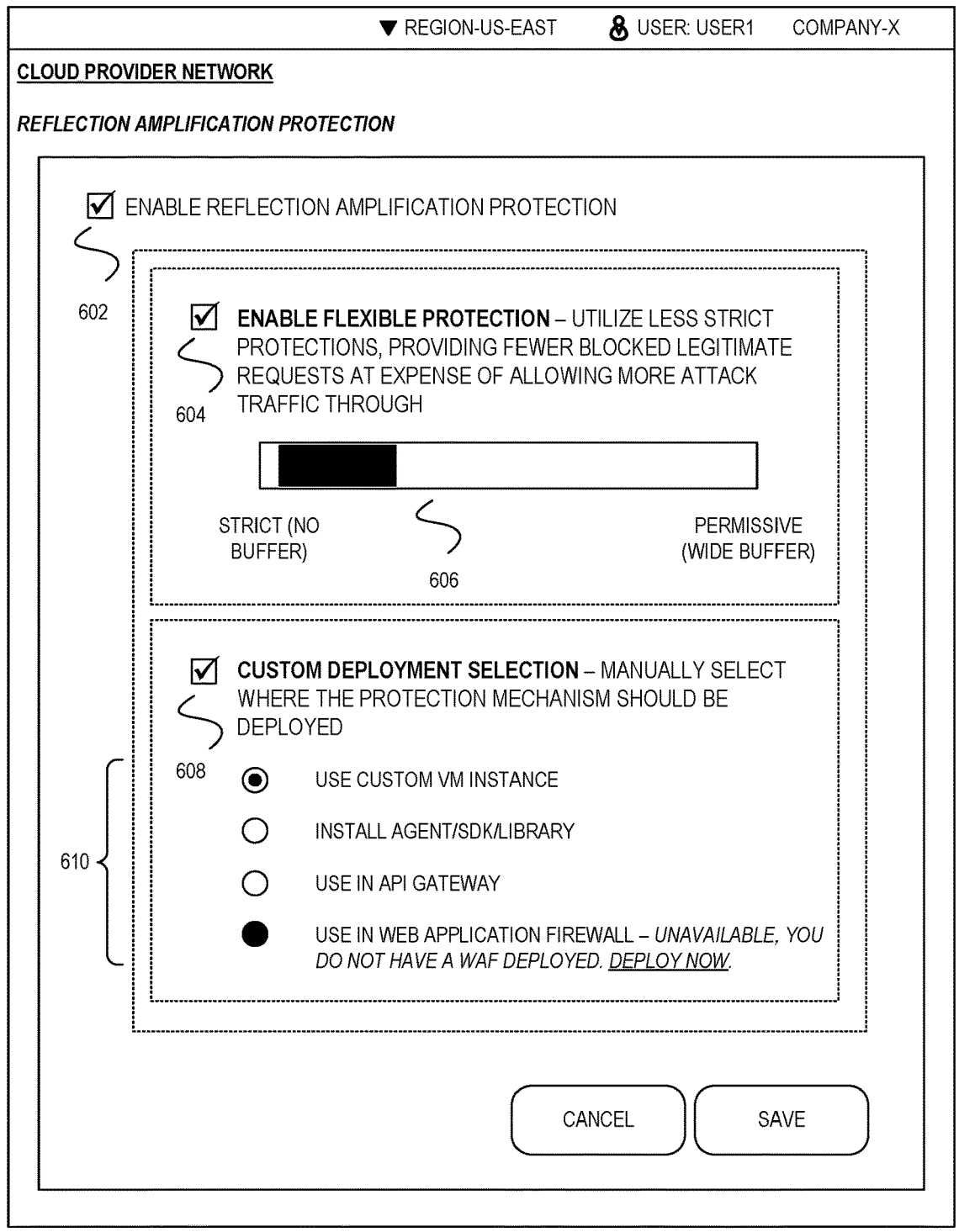
FIG. 6 is a diagram illustrating an exemplary graphical user interface providing customizable amplification reflection attack protection scheme using routing policy-aware traffic handling according to some examples.

FIG. 6 is a diagram illustrating an exemplary graphical user interface 600 (GUI) providing customizable amplification reflection attack protection scheme using routing policy-aware traffic handling according to some examples. In some examples, various aspects of amplification reflection attack protection can be configured by users, e.g., users having resources deployed in cloud provider networks, such as applications or other components that could potentially become inadvertent reflectors in an attack.

As shown, this exemplary GUI 600 includes a first user input element (here, a checkbox) enabling the user to turn protection or off. When the feature is enabled, additional portions of the GUI 600 may become active and selectable. In this case, a first option 604 becomes selectable (via another checkbox user input element), allowing the user to enable "flexible" protection, and to customize the threshold/severity of flexible protection via another user input element, here a slider bar 606.

In some scenarios, some flexibility may be desired by an implementing user, e.g., to prevent blocking (or interfering with) traffic that might be non-malicious but appear malicious according to the configuration. For example, an end user may be utilizing an application from an allowable location/source IP address but may be travelling on a train or in a car, and due to movement may end up in a different location, and/or with a different source IP address. In this example, some routing policies may suddenly block the user from accessing the same responder component 108, which may be disruptive and not at all desired. Accordingly, some flexibility in the operation of the system can be implemented, allowing the user to configure an amount of flexibility or forgiveness in its operation—e.g., a "nearby" client (that is out of the acceptable location, by some threshold that is set based on the user configuration using slider 605) may be allowed to have their traffic processed. As another example, remediative actions may not be implemented for a first number of requests seen in some unit time from a common source network address, and only when some threshold number of requests in the unit time are seen would a remediative action be performed. Moreover, the type of remediative action could similarly change as various thresholds are met—e.g., at first a cookie is passed back to the client, or a connection is reset, whereas when further thresholds are passed the traffic could be dropped.

The GUI 600 also includes another section where a user can enable (via user interface element 608) their control of how/where the RAP module 200B is deployed, which may occur via user input elements 610 (here, radio buttons allowing only one selection). In this example, a user could select that they want to use a custom virtual machine instance (for executing their application instance, or as a standalone instance), install a custom agent, SDK, or library themselves, enable the functionality in a gateway, enable the functionality in a web application firewall (WAF), etc. In this example, various options can be grayed out and non-selectable if the provider network can determine that the option is unavailable or non-applicable for the user's application—e.g., due to no WAF existing.

Figure 7:
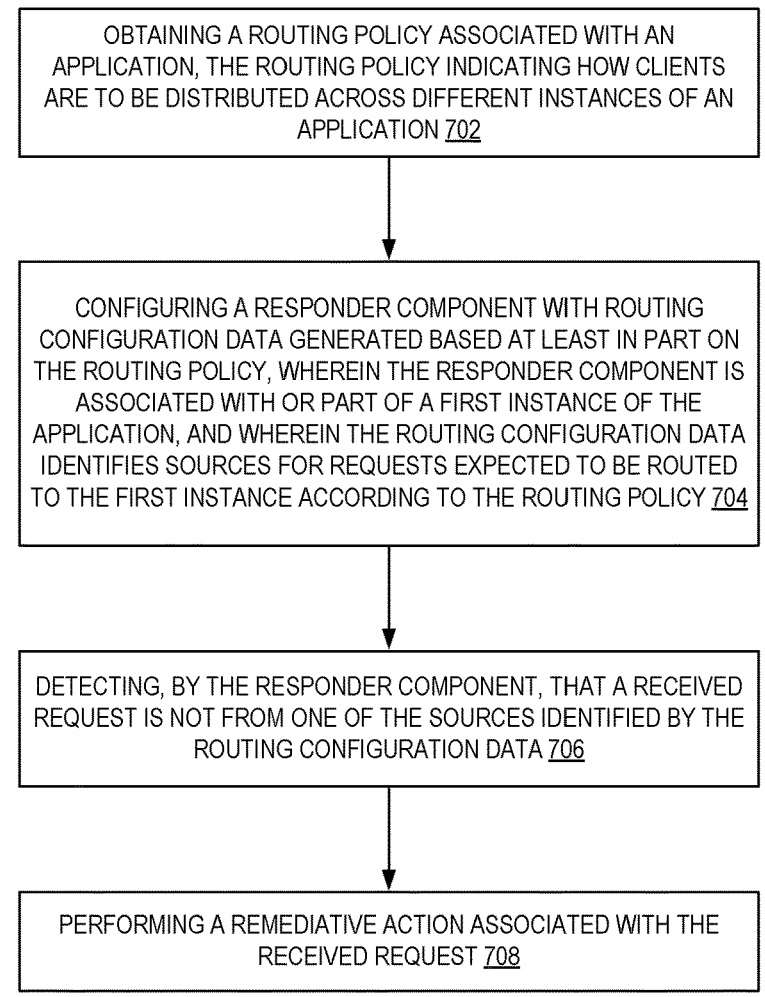
FIG. 7 is a flow diagram illustrating operations of a method for amplification reflection attack protection using routing policy-aware traffic handling according to some examples.

FIG. 7 is a flow diagram illustrating operations 700 of a method for amplification reflection attack protection using routing policy-aware traffic handling according to some examples. Some or all of the operations 700 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 700 are performed by the RAP module 200, responder component 108, services 110, and/or DNS service 204 of the other figures.

The operations 700 include, at block 702, obtaining a routing policy associated with an application, the routing policy indicating how clients are to be distributed across different instances of an application. The obtaining can be performed by a DNS service 204, for example.

The operations 700 further include, at block 704, configuring a responder component with routing configuration data generated based at least in part on the routing policy, wherein the responder component is associated with or part of a first instance of the application, and wherein the routing configuration data identifies sources for requests expected to be routed to the first instance according to the routing policy. The configuring may be done by the responder component itself, by the DNS service 204, or by a provider network's control plane.

In some examples, the responder component and the first instance of the application are implemented within a multi-tenant cloud provider network, wherein the responder component is deployed using one or more of: a user data protocol (UDP) protocol handler, a datagram transport layer security (DTKS) protocol handler, or a QUIC protocol handler; a content delivery network; or an operating-system based firewall.

The operations 700 further include, at block 706, detecting, by the responder component, that a received request is not from one of the sources identified by the routing configuration data.

In some examples, the routing configuration data comprises one or more network addresses or Classless Inter-Domain Routing (CIDR) address blocks; and the detecting that the received request is not from one of the sources comprises determining that a source network address, of the received request, is not associated with any of the geographic regions.

The operations 700 further include, at block 708, performing a remediative action associated with the received request. In some examples, the remediative action comprises dropping the received request, whereby the received request is not processed and an expected response is not generated or transmitted. In some examples, the remediative action comprises transmitting a response to the received request that is smaller than a full response or requires the recipient to perform a further action before obtaining the full response.

In some examples, the routing policy is a geolocation or geoproximity based policy that routes traffic from sources based on inferred geographic locations of clients that originate domain name service (DNS) queries. In some examples, the routing configuration data identifies one or more geographic regions from which requests are expected to be routed to the first instance according to the routing policy; and the detecting that the received request is not from one of the sources comprises determining that a source network address, of the received request, is not associated with any of the one or more geographic regions. In some examples, the detecting that the received request is not from one of the sources comprises: performing a lookup, based on use of a source network address of the received request, to identify an associated geographic location; and determining that the identified geographic location is not within any of the geographic regions identified in the routing configuration data. The operations 700 further include, in some examples, inserting, by the responder component into a cache, an entry that associates the source network address of the received request with the identified geographic location; and using the cache for processing a subsequent received request, originated from the same source network address, to identify the associated geographic location.

The operations 700 further include, in some examples, receiving, at the responder component, a message originated by a domain name system (DNS) system that includes the routing configuration data, wherein the DNS system sent the message after its receipt of a DNS lookup request, originated by a client using a source network address that seeks a network address associated with the application, wherein the DNS system has or will respond to the DNS lookup request with a response indicating that the client is to use a network address associated with the first instance of the application, wherein the routing configuration data comprises the source network address used by the client.

In some examples, the received request, obtained by the responder component and determined not to be from one of the sources identified by the routing configuration data, was originated by the client using a spoofed source network address that is different than the source network address of the DNS lookup request.

The operations 700 further include, in some examples, receiving a tolerance configuration value to be associated with the application, the tolerance configuration value identifying a degree of strictness of processing for requests not fitting within the sources identified by the routing configuration data; and configuring the responder component based on the tolerance configuration value, whereby at least one later request having a source network address not strictly falling within the sources identified by the routing configuration data is processed fully and a full response is sent for the later request.

Figure 8:
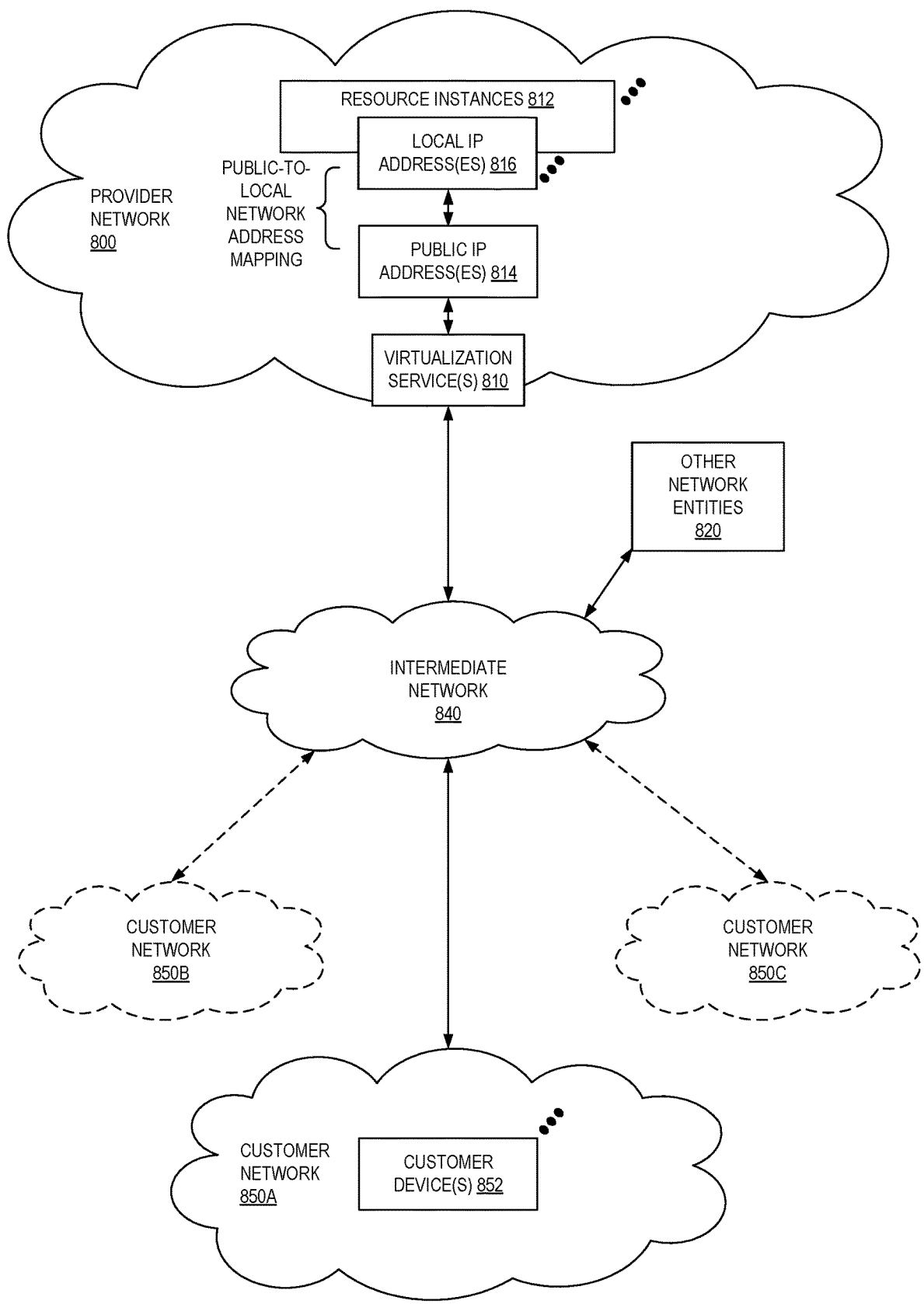
FIG. 8 illustrates an example provider network environment according to some examples.

FIG. 8 illustrates an example provider network (or "service provider system") environment according to some examples. A provider network 800 can provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 can be associated with the resource instances 812; the local IP addresses are the internal network addresses of the resource instances 812 on the provider network 800. In some examples, the provider network 800 can also provide public IP addresses 814 and/or public IP address ranges (e.g., Internet Protocol version 4 (IPv4) or Internet Protocol version 6 (IPv6) addresses) that customers can obtain from the provider 800.

Conventionally, the provider network 800, via the virtualization services 810, can allow a customer of the service provider (e.g., a customer that operates one or more customer networks 850A-850C (or "client networks") including one or more customer device(s) 852) to dynamically associate at least some public IP addresses 814 assigned or allocated to the customer with particular resource instances 812 assigned to the customer. The provider network 800 can also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of the customer network(s) 850A-850C can, for example, implement customer-specific applications and present the customer's applications on an intermediate network 840, such as the Internet. Other network entities 820 on the intermediate network 840 can then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 can be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 800; a customer can then assign their allocated public IP addresses to particular resource instances allocated to the customer. These public IP addresses can be referred to as customer public IP addresses, or simply customer IP addresses. Instead of being assigned by the provider network 800 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
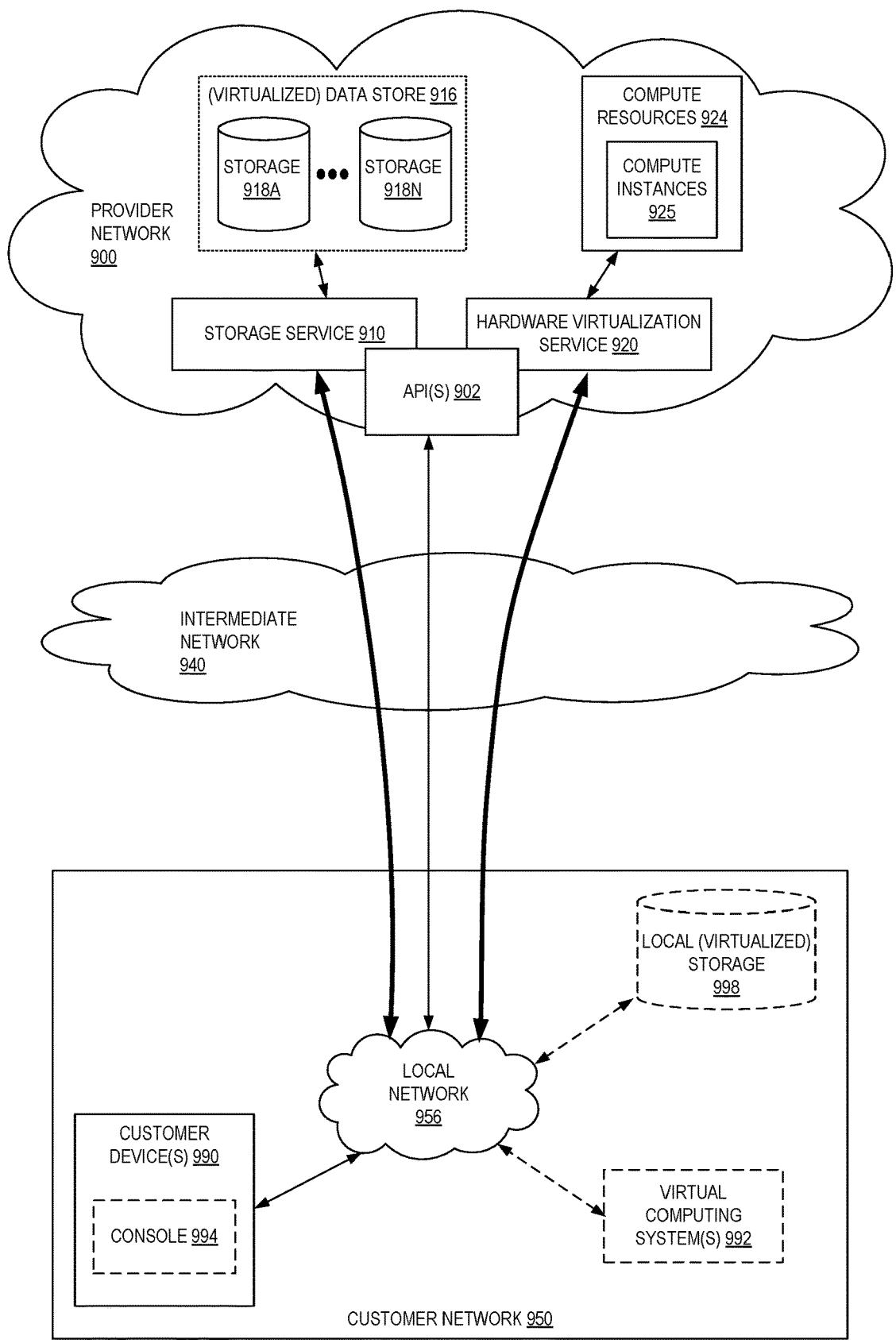
FIG. 9 is a block diagram of an example provider network that provides a storage service and a hardware virtualization service to customers according to some examples.

FIG. 9 is a block diagram of an example provider network environment that provides a storage service and a hardware virtualization service to customers, according to some examples. A hardware virtualization service 920 provides multiple compute resources 924 (e.g., compute instances 925, such as VMs) to customers. The compute resources 924 can, for example, be provided as a service to customers of a provider network 900 (e.g., to a customer that implements a customer network 950). Each computation resource 924 can be provided with one or more local IP addresses. The provider network 900 can be configured to route packets from the local IP addresses of the compute resources 924 to public Internet destinations, and from public Internet sources to the local IP addresses of the compute resources 924.

The provider network 900 can provide the customer network 950, for example coupled to an intermediate network 940 via a local network 956, the ability to implement virtual computing systems 992 via the hardware virtualization service 920 coupled to the intermediate network 940 and to the provider network 900. In some examples, the hardware virtualization service 920 can provide one or more APIs 902, for example a web services interface, via which the customer network 950 can access functionality provided by the hardware virtualization service 920, for example via a console 994 (e.g., a web-based application, standalone application, mobile application, etc.) of a customer device 990. In some examples, at the provider network 900, each virtual computing system 992 at the customer network 950 can correspond to a computation resource 924 that is leased, rented, or otherwise provided to the customer network 950.

From an instance of the virtual computing system(s) 992 and/or another customer device 990 (e.g., via console 994), the customer can access the functionality of a storage service 910, for example via the one or more APIs 902, to access data from and store data to storage resources 918A-918N of a virtual data store 916 (e.g., a folder or "bucket," a virtualized volume, a database, etc.) provided by the provider network 900. In some examples, a virtualized data store gateway (not shown) can be provided at the customer network 950 that can locally cache at least some data, for example frequently accessed or critical data, and that can communicate with the storage service 910 via one or more communications channels to upload new or modified data from a local cache so that the primary store of data (the virtualized data store 916) is maintained. In some examples, a user, via the virtual computing system 992 and/or another customer device 990, can mount and access virtual data store 916 volumes via the storage service 910 acting as a storage virtualization service, and these volumes can appear to the user as local (virtualized) storage 998.

While not shown in FIG. 9, the virtualization service(s) can also be accessed from resource instances within the provider network 900 via the API(s) 902. For example, a customer, appliance service provider, or other entity can access a virtualization service from within a respective virtual network on the provider network 900 via the API(s) 902 to request allocation of one or more resource instances within the virtual network or within another virtual network.

Illustrative Systems

Figure 10:
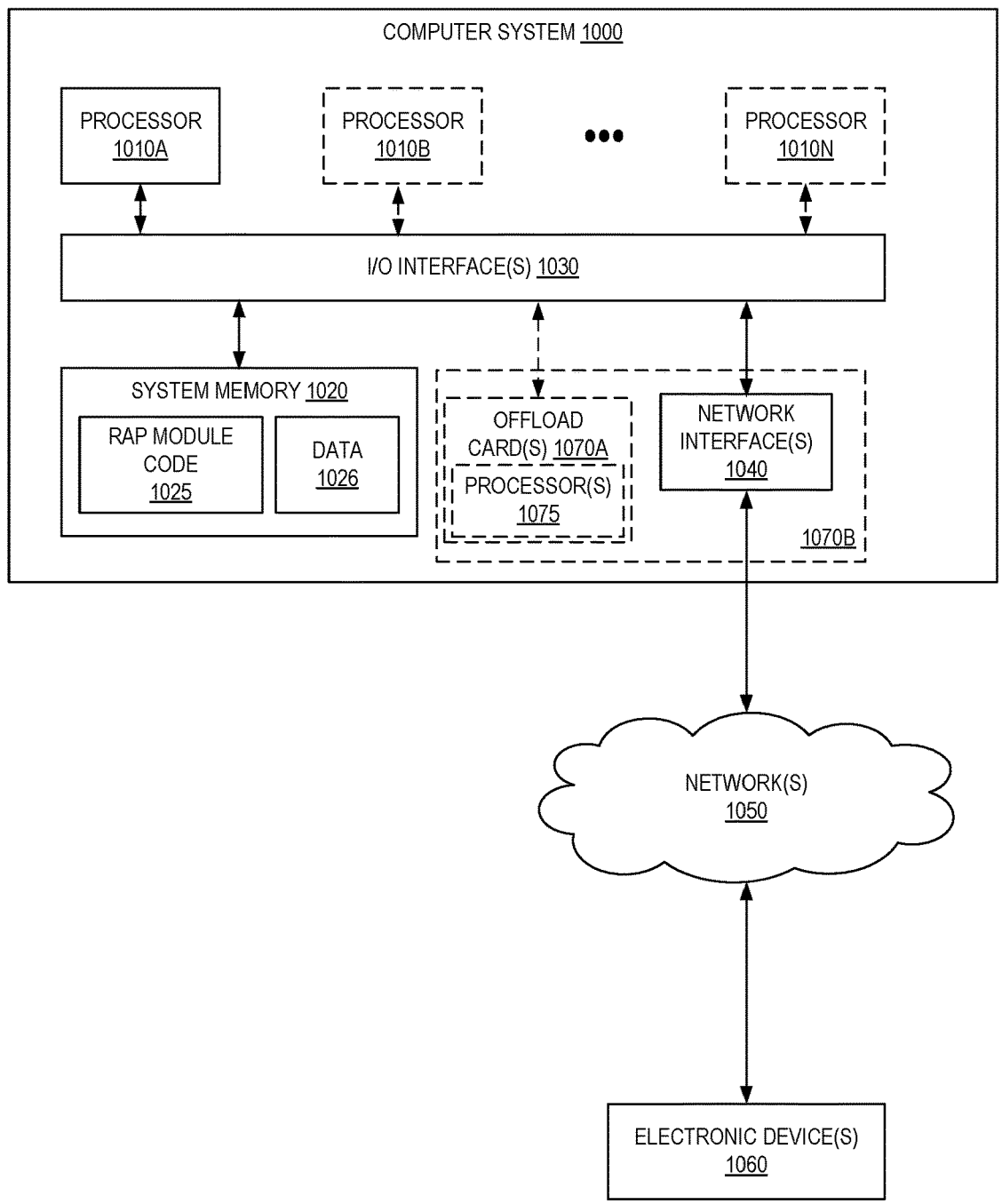
FIG. 10 is a block diagram illustrating an example computer system that can be used in some examples.

In some examples, a system that implements a portion or all of the techniques described herein can include a general-purpose computer system, such as the computer system 1000 (also referred to as a computing device or electronic device) illustrated in FIG. 10, that includes, or is configured to access, one or more computer-accessible media. In the illustrated example, the computer system 1000 includes one or more processors 1010 coupled to a system memory 1020 via an input/output (I/O) interface 1030. The computer system 1000 further includes a network interface 1040 coupled to the I/O interface 1030. While FIG. 10 shows the computer system 1000 as a single computing device, in various examples the computer system 1000 can include one computing device or any number of computing devices configured to work together as a single computer system 1000.

In various examples, the computer system 1000 can be a uniprocessor system including one processor 1010, or a multiprocessor system including several processors 1010 (e.g., two, four, eight, or another suitable number). The processor(s) 1010 can be any suitable processor(s) capable of executing instructions. For example, in various examples, the processor(s) 1010 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1010 can commonly, but not necessarily, implement the same ISA.

The system memory 1020 can store instructions and data accessible by the processor(s) 1010. In various examples, the system memory 1020 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1020 as RAP module code 1025 (e.g., executable to implement, in whole or in part, the RAP module 200) and data 1026.

In some examples, the I/O interface 1030 can be configured to coordinate I/O traffic between the processor 1010, the system memory 1020, and any peripheral devices in the device, including the network interface 1040 and/or other peripheral interfaces (not shown). In some examples, the I/O interface 1030 can perform any necessary protocol, timing, or other data transformations to convert data signals from one component (e.g., the system memory 1020) into a format suitable for use by another component (e.g., the processor 1010). In some examples, the I/O interface 1030 can include support for devices attached through various types of peripheral buses, such as a variant of the Peripheral Component Interconnect (PCI) bus standard or the Universal Serial Bus (USB) standard, for example. In some examples, the function of the I/O interface 1030 can be split into two or more separate components, such as a north bridge and a south bridge, for example. Also, in some examples, some or all of the functionality of the I/O interface 1030, such as an interface to the system memory 1020, can be incorporated directly into the processor 1010.

The network interface 1040 can be configured to allow data to be exchanged between the computer system 1000 and other devices 1060 attached to a network or networks 1050, such as other computer systems or devices as illustrated in FIG. 1, for example. In various examples, the network interface 1040 can support communication via any suitable wired or wireless general data networks, such as types of Ethernet network, for example. Additionally, the network interface 1040 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1000 includes one or more offload cards 1070A or 1070B (including one or more processors 1075, and possibly including the one or more network interfaces 1040) that are connected using the I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1000 can act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some examples the offload card(s) 1070A or 1070B can perform compute instance management operations, such as pausing and/or un-pausing compute instances, launching and/or terminating compute instances, performing memory transfer/copying operations, etc. These management operations can, in some examples, be performed by the offload card(s) 1070A or 1070B in coordination with a hypervisor (e.g., upon a request from a hypervisor) that is executed by the other processors 1010A-1010N of the computer system 1000. However, in some examples the virtualization manager implemented by the offload card(s) 1070A or 1070B can accommodate requests from other entities (e.g., from compute instances themselves), and can not coordinate with (or service) any separate hypervisor.

In some examples, the system memory 1020 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1000 via the I/O interface 1030. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1000 as the system memory 1020 or another type of memory. Further, a computer-accessible medium can include transmission media or signals such as electrical, electromagnetic, or digital signals, conveyed via a communication medium such as a network and/or a wireless link, such as can be implemented via the network interface 1040.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 918A-918N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
obtaining a routing policy associated with an application, the routing policy indicating how clients are to be distributed across different instances of an application, wherein the routing policy is a geolocation or geoproximity based policy that routes traffic from sources based on inferred geographic locations of clients that originate domain name service (DNS) queries;
configuring a responder component with routing configuration data generated based at least in part on the routing policy, wherein the responder component is associated with or part of a first instance of the application, and wherein the routing configuration data identifies sources for requests expected to be routed to the first instance according to the routing policy;
detecting, by the responder component, that a received request is not from one of the sources identified by the routing configuration data; and
performing a remediative action associated with the received request.

2. The computer-implemented method of claim 1, wherein:
the routing configuration data identifies one or more geographic regions from which requests are expected to be routed to the first instance according to the routing policy; and
the detecting that the received request is not from one of the sources comprises determining that a source network address, of the received request, is not associated with any of the one or more geographic regions.

3. The computer-implemented method of claim 2, wherein the detecting that the received request is not from one of the sources comprises:
performing a lookup, based on use of a source network address of the received request, to identify an associated geographic location; and
determining that the identified geographic location is not within any of the geographic regions identified in the routing configuration data.

4. The computer-implemented method of claim 3, further comprising:
inserting, by the responder component into a cache, an entry that associates the source network address of the received request with the identified geographic location; and
using the cache for processing a subsequent received request, originated from the same source network address, to identify the associated geographic location.

5. The computer-implemented method of claim 1, wherein:
the routing configuration data comprises one or more network addresses or Classless Inter-Domain Routing (CIDR) address blocks; and
the detecting that the received request is not from one of the sources comprises determining that a source network address, of the received request, is not associated with any of one or more geographic regions.

6. The computer-implemented method of claim 1, wherein the remediative action comprises dropping the received request, whereby the received request is not processed and an expected response is not generated or transmitted.

7. The computer-implemented method of claim 1, wherein the remediative action comprises transmitting a response to the received request that is smaller than a full response or requires a recipient to perform a further action before obtaining the full response.

8. The computer-implemented method of claim 1, further comprising:
receiving, at the responder component, a message originated by a domain name system (DNS) system that includes the routing configuration data, wherein the DNS system sent the message after its receipt of a DNS lookup request, originated by a client using a source network address that seeks a network address associated with the application, wherein the DNS system has or will respond to the DNS lookup request with a response indicating that the client is to use a network address associated with the first instance of the application, wherein the routing configuration data comprises the source network address used by the client.

9. The computer-implemented method of claim 8, wherein the received request, obtained by the responder component and determined not to be from one of the sources identified by the routing configuration data, was originated by the client using a spoofed source network address that is different than the source network address of the DNS lookup request.

10. The computer-implemented method of claim 1, wherein the responder component and the first instance of the application are implemented within a multi-tenant cloud provider network, wherein the responder component is deployed using one or more of:
a user data protocol (UDP) protocol handler, a datagram transport layer security (DTKS) protocol handler, or a QUIC protocol handler;
a content delivery network; or
an operating-system based firewall.

11. The computer-implemented method of claim 1, further comprising:
receiving a tolerance configuration value to be associated with the application, the tolerance configuration value identifying a degree of strictness of processing for requests not fitting within the sources identified by the routing configuration data; and
configuring the responder component based on the tolerance configuration value, whereby at least one later request having a source network address not strictly falling within the sources identified by the routing configuration data is processed fully and a full response is sent for the later request.

12. A system comprising:
a first one or more electronic devices to implement a domain name service (DNS) in a multi-tenant provider network, the DNS service to receive and utilize a routing policy indicating how clients are to be distributed across different instances of an application; and
a second one or more electronic devices that implement a responder component within the multi-tenant provider network, wherein the responder component is associated with or part of a first instance of the application, and wherein the responder component includes instructions that upon execution cause the responder component to:
install routing configuration data that was generated based at least in part on the routing policy, wherein the routing configuration data identifies sources for requests expected to be routed to the first instance according to the routing policy;
receive a request destined to the first instance;
detect that the request is not from one of the sources identified by the routing configuration data; and
perform a remediative action associated with the request.

13. The system of claim 12, wherein the routing policy is a geolocation or geoproximity based policy that routes traffic from sources based on inferred geographic locations of clients that originate domain name service (DNS) queries.

14. The system of claim 13, wherein:
the routing configuration data identifies one or more geographic regions from which requests are expected to be routed to the first instance according to the routing policy; and
the detection that the received request is not from one of the sources comprises determining that a source network address, of the received request, is not associated with any of the one or more geographic regions.

15. The system of claim 14, wherein the detection that the received request is not from one of the sources comprises:
performing a lookup, based on use of a source network address of the received request, to identify an associated geographic location; and
determining that the identified geographic location is not within any of the geographic regions identified in the routing configuration data.

16. The system of claim 15, wherein the responder component further includes instructions that upon execution cause the responder component to:
insert, into a cache, an entry that associates the source network address of the received request with the identified geographic location; and
use the cache for processing a subsequent received request, originated from the same source network address, to identify the associated geographic location.

17. A computer-implemented method comprising:
obtaining a routing policy associated with an application, the routing policy indicating how clients are to be distributed across different instances of an application;
configuring a responder component with routing configuration data generated based at least in part on the routing policy, wherein the responder component is associated with or part of a first instance of the application, and wherein the routing configuration data identifies sources for requests expected to be routed to the first instance according to the routing policy;

detecting, by the responder component, that a received request is not from one of the sources identified by the routing configuration data; and performing a remediative action associated with the received request, wherein the responder component and the first instance of the application are implemented within a multi-tenant cloud provider network, wherein the responder component is deployed using one or more of:
- a user data protocol (UDP) protocol handler, a datagram transport layer security (DTKS) protocol handler, or a QUIC protocol handler;
- a content delivery network; or
- an operating-system based firewall.

18. The computer-implemented method of claim 17, wherein the remediative action comprises transmitting a response to the received request that is smaller than a full response or requires a recipient to perform a further action before obtaining the full response.

19. A computer-implemented method comprising:

obtaining a routing policy associated with an application, the routing policy indicating how clients are to be distributed across different instances of an application;

configuring a responder component with routing configuration data generated based at least in part on the routing policy, wherein the responder component is associated with or part of a first instance of the application, and wherein the routing configuration data identifies sources for requests expected to be routed to the first instance according to the routing policy;

detecting, by the responder component, that a received request is not from one of the sources identified by the routing configuration data;

performing a remediative action associated with the received request;

receiving a tolerance configuration value to be associated with the application, the tolerance configuration value identifying a degree of strictness of processing for requests not fitting within the sources identified by the routing configuration data; and configuring the responder component based on the tolerance configuration value, whereby at least one later request having a source network address not strictly falling within the sources identified by the routing configuration data is processed fully and a full response is sent for the later request.

20. The computer-implemented method of claim 19, further comprising:

receiving, at the responder component, a message originated by a domain name system (DNS) system that includes the routing configuration data, wherein the DNS system sent the message after its receipt of a DNS lookup request, originated by a client using a source network address that seeks a network address associated with the application, wherein the DNS system has or will respond to the DNS lookup request with a response indicating that the client is to use a network address associated with the first instance of the application, wherein the routing configuration data comprises the source network address used by the client.

* * * * *